United States Patent
Brabbs et al.

(10) Patent No.: US 6,759,178 B2
(45) Date of Patent: Jul. 6, 2004

(54) POLYMERIC FILM HAVING A COATING LAYER OF A PHOSPHONIC ACID GROUP CONTAINING POLYMER

(75) Inventors: Noel Stephen Brabbs, Garnich (LU); Andrew Charles Street, North Yorkshire (GB); Karen Goodchild, Saltburn (GB); Cornell Chappel, Jr., Petersburg, VA (US); Junaid Ahmed Siddiqui, Richmond, VA (US); Stephen Derek Rogers, Cleveland (GB)

(73) Assignee: DuPont Teijin Films US Limited Partnership, Wilmington, DE (US)

( * ) Notice: Subject to any disclaimer, the term of this patent is extended or adjusted under 35 U.S.C. 154(b) by 0 days.

(21) Appl. No.: 10/210,456

(22) Filed: Jul. 31, 2002

(65) Prior Publication Data

US 2003/0013042 A1 Jan. 16, 2003

Related U.S. Application Data

(62) Division of application No. 09/582,481, filed on Jun. 21, 2000, now Pat. No. 6,495,309.

(51) Int. Cl.$^7$ ............................... G03F 7/09; G03C 1/76
(52) U.S. Cl. .................. 430/302; 430/271.1; 430/905; 430/910
(58) Field of Search ............................. 430/302, 271.1, 430/905, 910

(56) References Cited

U.S. PATENT DOCUMENTS

| | | | |
|---|---|---|---|
| 4,370,379 A | 1/1983 | Kato et al. | |
| 4,879,201 A | 11/1989 | Hasegawa | |
| 5,178,963 A | 1/1993 | Faust et al. | |
| 5,258,230 A | 11/1993 | LaFleur et al. | |
| 5,262,244 A | * 11/1993 | Faust et al. ................. | 428/463 |
| 5,714,559 A | 2/1998 | Schacht et al. | |
| 5,880,183 A | 3/1999 | Yeo | |
| 5,973,049 A | 10/1999 | Bieser et al. | |
| 6,114,426 A | 9/2000 | Burack et al. | |

FOREIGN PATENT DOCUMENTS

WO  WO95/09384  4/1995

\* cited by examiner

*Primary Examiner*—Mark F. Huff
*Assistant Examiner*—Sin J. Lee

(57) ABSTRACT

A printing plate includes a substantially free gelatin free polymeric film which includes a coating layer of a polymer having at least one -POXY pendant group, pendant carboxyl groups and further comprises a sulphonated monomer, salt or derivative.

11 Claims, No Drawings

POLYMERIC FILM HAVING A COATING LAYER OF A PHOSPHONIC ACID GROUP CONTAINING POLYMER

RELATED APPLICATION

The present patent application is a division of Ser. No. 09/582,481 filed Jun. 21, 2000 now U.S. Pat. No. 6,495,309.

This invention relates to a polymeric film, and in particular to a polymeric film which is substantially gelatin free and has a coating layer which is suitable for use as a component of a printing plate.

Printing plates, particularly lithographic printing plates, generally comprise a substrate, a hydrophilic coating layer, and a photopolymerizable light-sensitive layer. Imagewise exposure, by a suitable light source, results in hardening of the photopolymerizable layer, allowing the unhardened portions of the layer to be removed by washing with a solvent. The result is a hydrophobic polymer image on a hydrophilic substrate, which can be used as a lithographic printing plate. In an alternative process, a hydrophobic toner is applied to the hydrophilic coating layer by means of a laser imaging process.

The surface properties of the hydrophilic coating layer can be crucial in determining the quality of the final printed image. For example, some prior art hydrophilic coating layers exhibit poor coat quality and insufficient adhesion to the underlying substrate and/or overlying photopolymerized layer or toner. In addition, the coating layer may possess insufficient hydrophilicity and/or a surface topography which can lead to inadequate removal of the unhardened photopolymerized portions, resuming in the formation of a relatively poor quality printed image. In laser toner based processes the hydrophilic coating layer may require antistatic properties to control or avoid toner scatter, which reduces the quality of the final image.

Relatively high temperatures are employed in some processes used for producing printing plates, which can affect the curl and flatness of any polymeric film present in a printing plate.

Hydrophilic coating layers such as gelatin are traditionally applied to a polymeric film after the production of the film has been completed, i.e., "off-line", which results in an increase in the number of process steps required to produce the coated film. There is a need to be able to apply the coating layer during the film making process, i.e., "in-line", without the use of gelatin in order to simplify and improve the efficiency of the production process.

We have now devised a polymeric film which reduces or substantially overcomes at least one of the aforementioned problems.

Accordingly, the present invention provides a polymeric film which is substantially gelatin free and comprises a polymeric film substrate having on at least one surface thereof, a coating layer comprising a polymer comprising at least one or more repeating units comprising at least one or more pendant (—POXY) groups, wherein X and Y, which may be the same or different, are OH or OM wherein M is a cation.

The invention further provides a method of producing a polymeric film which comprises forming a polymeric film substrate, applying a coating composition to at least one surface of the substrate, the coating composition comprising a polymer comprising at least one or more repeating units comprising at least one or more pendant (—POXY) groups, wherein X and Y, which may be the same or different, are OH or OM wherein M is a cation.

The invention also provides a printing plate comprising a polymeric film substrate having on at least one surface thereof, a coating layer comprising a polymer comprising at least one or more repeating units comprising at least one or more pendant (—POXY) groups, wherein X and Y, which may be the same or different, are OH or OM wherein M is a cation.

The polymeric film according to the invention can also be fused as coating for mirrors, in particular car mirrors, and building surface cladding. The polymeric film substrate is a film capable of independent existence in the absence of a supporting base.

The substrate, to which a coating layer composition is applied to yield a polymeric film according to the invention, may be formed from any suitable film-forming, polymeric material. Thermoplastics materials are preferred, and include a homopolymer or copolymer of a 1-olefin, such as ethylene, propylene and but-1-ene, a polyamide, a polycarbonate, more preferably a polyester, and particularly a synthetic linear polyester which may be obtained by condensing one or more dicarboxylic acids or their lower alkyl (up to 6 carbon atoms) diesters, e.g., terephthalic acid, isophthalic acid, phthalic acid, 2,5-, 2,6- or 2,7-naphthalenedicarboxylic acid, succinic acid, sebacic acid, adipic acid, azelaic acid, 4,4'-diphenyldicarboxylic acid, hexahydro-terephthalic acid or 1,2-bis-p-carboxyphenoxyethane (optionally with a monocarboxylic acid, such as pivalic acid) with one or more glycols, particularly aliphatic glycols, e.g., ethylene glycol, 1,3-propanediol, 1,4-butanediol, neopentyl glycol and 1,4-cyclohexane-dimethanol. A polyethylene terephthalate and/or polyethylene naphthalate film is preferred. A polyethylene terephthalate film is particularly preferred, especially such a film which has been biaxially oriented by sequential stretching in two mutually perpendicular directions, typically at a temperature in the range from 70 to 125° C., and preferably heat set, typically at a temperature in the range from 150 to 250° C., for example as described in GB-A-838708. Another preferred film comprises a copolymer of terephthalic and isophthalic acids with ethylene glycol. The substrate may also comprise a polyarylether or thio analogue thereof, particularly a polyaryletherketone, polyarylethersulphone, polyaryletherether-ketone, polyaryletherethersulphone, or a copolymer or thioanalogue thereof. Examples of these polymers are disclosed in EP-A-1879, EP-A-184458 and U.S. Pat. No. 4,008,203. Blends of these polymers may also be employed. A poly p-phenylene sulphide film is also suitable.

Suitable thermoset resin substrate materials include addition-polymerization resins, such as acrylics, vinyls, bis-maleimides and unsaturated polyesters, formaldehyde condensate resins such as condensates with urea, melamine or phenols, cyanate resins, isocyanate resins, epoxy resins, functionalized polyesters, polyamides or polyimides.

A film substrate for a polymeric film according to the invention may be unoriented or preferably oriented, for example uniaxially oriented, or more preferably biaxially oriented by drawing in two mutually perpendicular directions in the plane of the film to achieve a satisfactory combination of mechanical and physical properties. Formation of the film may be effected by any process known in the art for producing a polymeric film, for example a tubular or a flat film process.

In a tubular process simultaneous biaxial orientation may be effected by extruding a thermoplastics polymeric tube which is subsequently quenched, reheated and then expanded by internal gas pressure to induce transverse orientation, and withdrawn at a rate which will induce longitudinal orientation.

In the preferred flat film process a film-forming polymer is extruded through a slot die and rapidly quenched upon a chilled casting surface (drum) to ensure that the polymer is quenched to the amorphous state. Orientation is then effected by stretching the quenched extrudate in at least one direction at a temperature above the glass transition temperature of the polymer. Sequential orientation may be effected by stretching a flat, quenched extrudate firstly in one direction, usually the longitudinal direction, i.e. the forward direction through the film stretching machine, and then in the transverse direction. Forward stretching of the extrudate is conventionally effected over a set of rotating rolls or between two pairs of nip rolls, transverse stretching then being effected in a stenter apparatus. Stretching is effected to an extent determined by the nature of the film-forming polymer, for example a polyester is usually stretched so that the dimension of the oriented polyester film is from 2.5 to 4.5 its original dimension in the, or each, direction of stretching.

A stretched film may be, and preferably is, dimensionally stabilized by heat-setting under dimensional restraint at a temperature above the glass transition temperature of the film-forming polymer but below the melting temperature thereof, to induce crystallization of the polymer.

In a preferred embodiment, and in order that the polymeric film of the present invention has a low distortion, reduced curl and improved flatness (or cockle), the polymeric film has a percentage thermal expansion in the film widthwise direction (TD) at 150° C. of 0.01 to 1.0%, and a percentage thermal shrinkage in the film lengthwise direction (MD) at 150° C. of 0.4 to 2.0%. Preferably the film exhibits a TD expansion at 150° C. of 0.2 to 0.8%, and a MD shrinkage at 150° C. of 0.5 to 1.5%, and particularly a TD expansion at 150° C. of 0.3 to 0.5%, and a MD shrinkage at 150° C. of 0.7 to 1.0%.

The substrate of a polymeric film of the present invention can be prepared, for example as described above, during the production of a biaxially drawn film. In a typical process for the production of a biaxially drawn film, the film is preferably firstly stretched in the longitudinal direction over a series of rotating rollers, and then stretched transversely in a stenter oven, preferably followed by heat setting under tension in the stenter apparatus. The tension in the widthwise direction can be provided by clips which hold the film, the clips being attached to parallel rails on opposite sides of the stenter apparatus. The tension in the widthwise direction can be reduced or removed, for example by moving the rails inwards towards the exit end of the stenter—this is known as "toe-in". By employing toe-in it is possible to allow the film to shrink to a certain degree, and by this means obtain film with the required TD expansion and MD shrinkage characteristics. The amount of toe-in employed, for example in the production of a polyethylene terephthalate film should be 0.1 to 10%, preferably 3 to 7%, and particularly 3.5 to 6%. The exact amount of toe-in required will depend upon the particular film being produced, and upon the other process conditions being used. It is preferred that the stenter is operated at relatively high temperatures, for example for polyethylene terephthalate film the stenter temperature is suitably 230 to 245° C., particularly 235 to 240° C.

In one embodiment of the invention the polymeric film is transparent, exhibiting high optical clarity and low haze, preferably having a wide angle haze, being measured according to the standard ASTM D 1003-61, of <8%, more preferably <6%, particularly <5%, and especially <3%, preferably for a 175 μm thick film. The aforementioned optical characteristics can be suitably achieved by having little or no particulate additive present in the substrate. The substrate may contain relatively small quantities of filler material, for example in the range from 5 to 3000 ppm, preferably 50 to 2000 ppm, and more preferably 100 to 1000 ppm. Suitable fillers include inorganic materials such as silica, china clay, calcium carbonate, and organic materials such as silicone resin particles. Spherical monodisperse fillers may be employed. The substrate may contain filler due to the normal practice of using reclaimed film in the film manufacturing process.

However, in a further embodiment of the invention the polymeric film is opaque, which is defined as a film exhibiting a Transmission Optical Density (Sakura Densitometer; type PDA 65; transmission mode) of from 0.75 to 1.75, and particularly of from 1.2 to 1.5, preferably for a 175 μm thick film. The polymeric film is conveniently rendered opaque by incorporating into the synthetic polymer of the substrate layer, an effective amount of an opacifying agent. Suitable opacifying agents include a particulate inorganic filler, an incompatible resin filler, or a mixture of two or more such fillers.

The polymeric film may also be translucent, i.e. having a transmission optical density of up to 0.75.

Particulate inorganic fillers suitable for generating an opaque film substrate include conventional inorganic pigments and fillers, and particularly metal or metalloid oxides, such as alumina, silica and titania, and alkaline metal salts, such as the carbonates and sulphates of calcium and barium. Suitable inorganic fillers may be homogeneous and consist essentially of a single filler material or compound, such as titanium dioxide or barium sulphate alone. Alternatively, at least a proportion of the filler may be heterogeneous, the primary filler material being associated with an additional modifying component. For example, the primary filler particle may be treated with a surface modifier, such as a pigment, soap, surfactant coupling agent or other modifier to promote or after the degree to which the filler is compatible with the outer layer polymer.

Suitable particulate inorganic fillers may be of the non-voiding or voiding type, i.e. by voiding is meant comprises a cellular structure containing at least a proportion of discrete, closed cells. Barium sulphate is an example of a filler which results in the formation of voids. Titanium dioxide may be of the voiding or non-voiding type, dependent upon the particular type of titanium dioxide employed. In a preferred embodiment of the invention, the film substrate comprises titanium dioxide particles, more preferably of the non-voiding type.

The amount of inorganic filler incorporated into the film substrate desirably should be not less than 2% nor exceed 40% by weight, based on the weight of the substrate polymer. Particularly satisfactory levels of opacity are achieved when the concentration of filler, suitably titanium dioxide, is preferably in the range from 5% to 25%, more preferably 8% to 18%, and particularly 11% to 14% by weight, based on the weight of the substrate polymer.

The inorganic filler particles preferably have a volume distributed median particle diameter (equivalent spherical diameter corresponding to 50% of the volume of all the particles, read on the cumulative distribution curve relating volume % to the diameter of the particles—often referred to as the "D(v,0.5)" value) in the range from 0.2 to 1.5 μm, more preferably 0.4 to 1.1 μm, particularly 0.6 to 0.8 μm, and especially 0.65 to 0.75 μm.

The preferred titanium dioxide particles may be of anatase or rutile crystal form. The titanium dioxide particles preferably comprise a major portion of anatase, more preferably at least 60%, particularly at least 80%, and especially approximately 100% by weight of anatase. The particles can be prepared by standard procedures, such as using the chloride process or preferably by the sulphate process.

In one embodiment of the invention the titanium dioxide particles are coated preferably with inorganic oxides of elements such as aluminum, silicon, zinc, magnesium or mixtures thereof. Preferably the coating additionally comprises an organic compound, such as fatty acids and preferably alkanols, suitably having from 8 to 30, preferably from 12 to 24 carbon atoms. Polydiorganosiloxanes or polyorganohydrogensiloxanes, such as polydimethylsiloxane or polymethylhydrogensiloxane are suitable organic compounds.

The coating is suitably applied to the titanium dioxide particles in aqueous suspension. The inorganic oxides are precipitated in aqueous suspension from water-soluble compounds such as sodium aluminate, aluminium sulphate, aluminium hydroxide, aluminium nitrate, silicic acid or sodium silicate.

The individual or primary titanium dioxide particles suitably have a mean crystal size, as determined by electron microscopy, in the range from 0.05 to 0.4 μm, preferably 0.1 to 0.3 μm, and more preferably 0.2 to 0.25 μm. In a preferred embodiment of the invention, the primary titanium dioxide particles aggregate to form clusters or agglomerates comprising a plurality of titanium dioxide particles. The aggregation process of the primary titanium dioxide particles may take place during the actual synthesis of the titanium dioxide and/or during the polymer and/or polymer film making process.

The film substrate optionally comprises an "incompatible resin" by which is meant a resin which either does not melt, or which is substantially immiscible with the substrate polymer, at the highest temperature encountered during extrusion and fabrication of the layer. Such resins include polyamides and olefin polymers, particularly a home- or co-polymer of a mono-alpha-olefin containing up to 6 carbon atoms in its molecule, for incorporation into polyester films, or polyesters of the kind hereinbefore described for incorporation into polyolefin films.

The amount of incompatible resin, preferably polyolefin, incorporated into the film substrate is preferably in the range from 1% to 15%, more preferably 3% to 10%, and particularly 5% to 8% by weight, based on the weight of the substrate polymer.

Incorporation of the opacifying agent, preferably inorganic filler, into the substrate layer polymer may be effected by conventional techniques, for example by mixing with the monomeric reactants from which the polymer is derived, by dry blending with the polymer in granular or chip form prior to formation of a film therefrom, or by using masterbatching technology.

By a pendant (—POXY) group of a repeating unit(s) of the coating layer polymer is meant a group which is not part of the backbone chain of the polymer, i.e. the group is present in a side chain attached to the backbone chain of the polymer. X and Y, which may be the same or different, are OH or OM wherein M is a cation. M may be a metal ion, preferably an alkali metal ion, more preferably $Li^+$, $Na^+$ or $K^+$, or a quaternary ammonium ion. Both X and Y are preferably OH groups, i.e. the preferred pendant group is

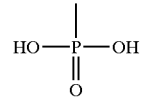

I

Thus, the coating layer polymer preferably comprises repeat units containing pendant phosphoric acid groups and/or salts or other derivatives thereof.

Suitable repeating units are derived during the polymerization of monoethylenically unsaturated monomers containing phosphonic acid groups, which may be aromatic, heterocyclic, aliphatic and cycloaliphatic. Preferred monomers include vinyl phosphonic acid, divinyl phosphonic acid, allyl phosphonic acid, methallyl phosphonic acid, vinyl phosphonic acid monomethyl ester, methacrylamidomethane phosphonic acid, 2-arylamido-2-methylpropane phosphonic acid, 3-phosphonopropyl acrylate and 3-phosphonopropyl methacrylate. Vinyl phosphoric acid is a particularly preferred monomer.

The coating layer polymer suitably comprises greater than 5 mole %, preferably in the range from 10 to 90 mole %, more preferably 30 to 80 mole %, particularly 45 to 75 mole % and especially 50 to 70 mole % of repeating units comprising phosphoric acid containing monomer as herein described.

The coating layer polymer is preferably a copolymer, comprising one or more, preferably acrylic, comonomers, in addition to the repeating units as herein described. Suitable additional comonomers may be selected from acrylic acid, methacrylic acid or a derivative of acrylic acid or methacrylic acid, preferably an ester of acrylic acid or methacrylic acid, especially an alkyl ester where the alkyl group contains up to ten carbon atoms such as methyl, ethyl, n-propyl, isopropyl, n-butyl, isobutyl, terbutyl, hexyl, 2-ethylhexyl, heptyl, and n-octyl. An alkyl acrylate, e.g., ethyl acrylate or butyl acrylate, and/or an alkyl methacrylate, e.g, methyl methacrylate, may be employed.

In a preferred embodiment of the present invention, the coating layer polymer additionally comprises repeating units containing pendant carboxyl groups, or groups which will form carboxyl groups on hydrolysis. Suitable carboxyl group-containing repeating groups are derived during the polymerization of monomers such as acrylic acid, methacrylic acid, itaconic acid, maleic acid, maleic anhydride, or derivatives thereof. Acrylic acid is a particularly preferred carboxyl group-containing comonomer.

The coating layer polymer preferably comprises in the range from 10 to 70 mole %, more preferably 30 to 60 mole %, particularly 30 to 55 mole % and especially 30 to 50 mole % of repeating units containing pendant carboxyl groups as herein described.

Other comonomers which are suitable for use in the preparation of the coating layer copolymer include acrylonitrile, methacrylonitrile, halo-substituted acrylonitrile, halo-substituted methacrylonitrile, hydroxyethyl methacrylate, glycidyl acrylate, glycidyl methacrylate, itaconic acid, itaconic anhydride and half esters of itaconic acid. Other optional comonomers include vinyl esters such as vinyl acetate, vinyl chloroacetate and vinyl benzoate; vinyl pyridine; vinyl chloride; vinylidene chloride; maleic acid; maleic anhydride; butadiene; ethylene imine; sulphonated monomers such as vinyl sulphonic acid; styrene and derivatives of styrene such as chloro styrene, hydroxy styrene and alkylated styrenes. A preferred class of comonomers comprises sulphonated monomers such as vinyl sulphonic acid or salts or other derivatives thereof, such as sodium vinyl sulphonate. Other suitable salts of vinyl sulphonic acid include the potassium and lithium salts.

The coating preferably comprises 1–60 mole %, more preferably 3–50 mole %, and particularly 5–30 mole % of such sulphonated comonomers in the coating layer copolymer.

A preferred coating layer polymer is a poly (acrylic acid co vinyl phosphonic acid) copolymer. A further preferred coating layer polymer is a terpolymer comprising acrylic acid, vinyl phosphonic acid and sodium vinyl sulphonate moieties.

The molecular weight of the coating layer polymer may vary over a wide range but the weight average molecular weight is preferably less than 5,000,000, more preferably within the range 2,000 to 200,000, particularly within the range 25,000 to 100,000, and especially within the range 35,000 to 80,000. The amount of coating layer polymer present in the coating layer composition is preferably in the range from 0.1 to 50, more preferably 0.1 to 20, and particularly 0.5 to 10 weight %, relative to the total solids of the composition.

The coating layer composition may additionally comprise a resin which is capable of enhancing the adhesion of toner to the coating. Suitable resins include acrylic polymers and copolymers, homopolymers and copolymers of styrene, acrylonitrile, sulphonated polyesters and blends of the aforementioned polymers and coploymers. One preferred class of compatibilizing resins is a copolymer of styrene and acrylic monomers, for example the resin sold as Neocryl BT70 by Zeneca.

In one embodiment of the present invention, the coating layer comprises an inorganic filler, suitably particulate materials such as silica, alumina, titanium dioxide and/or metal oxides.

The inorganic filler particles preferably have a volume distributed median particle diameter (equivalent spherical diameter corresponding to 50% of the volume of all the particles, read on the cumulative distribution curve relating volume % to the diameter of the particles—often referred to as the "D(v,0.5)" value) in the range from 0.1 to 10 $\mu$m.

Particle sizes of the filler particles may be measured by electron microscope, Coulter counter, sedimentation analysis and light scattering, preferably techniques based on laser light diffraction.

The amount of inorganic filler present in the coating layer composition is preferably in the range from 0.001 to 30, more preferably <10 weight %, relative to the total solids of the composition.

The coating layer optionally comprises a, preferably low molecular weight, cross-linking agent. The cross-linking agent is suitably an organic material, preferably a monomeric and/or oligomeric species, and particularly monomeric, prior to formation of the coating layer. The molecular weight of the cross-linking agent is preferably less than 2000, more preferably less than 1500, especially less than 1000, and particularly in the range from 250 to 500. Suitable cross-linking agents may comprise alkyd resins, amine derivatives such as hexamethoxymethyl melamine, and/or condensation products of an amine, e.g. melamine, diazine, urea, cyclic ethylene urea, cyclic propylene urea, thiourea, cyclic ethylene thiourea, aziridines, alkyl melamines, aryl melamines, benzo guanamines, guanamines, alkyl guanamines and aryl guanamines, with an aldehyde, e.g. formaldehyde. A preferred cross-linking agent is the condensation product of melamine with formaldehyde. The condensation product may optionally be alkoxylated. A catalyst is also preferably employed to facilitate cross-linking action of the cross-linking agent. Preferred catalysts for cross-linking melamine formaldehyde include ammonium chloride, ammonium nitrate, ammonium thiocyanate, ammonium dihydrogen phosphate, diammonium hydrogen phosphate, para toluene sulphonic acid, sulphuric acid, maleic acid stabilised by reaction with a base, ammonium para toluene sulphonate and morpholinium para toluene sulphonate.

A further preferred cross-linking agent is dimethylol urea.

The cross-linking agent preferably exhibits at least trifunctionality (i.e. three functional groups) to promote intermolecular cross-linking with the functional groups present in the hydroxy alkyl cellulose, and to improve adhesion of the coating layer to the surface of the underlying layer.

The amount of cross-linking agent present in the coating layer composition is preferably in the range from 0.1 to 25, more preferably 0.15 to 10, particularly 0.2 to 5, and especially 0.25 to 2 weight %, relative to the total solids of the composition.

The ratio of coating layer polymer to cross-linking agent present in the coating layer composition, and consequently in the coating layer, is preferably in the range from 500 to 0.005:1, more preferably 150 to 0.01:1, and particularly 50 to 0.1:1 by weight.

If desired, the coating layer composition may additionally comprise a surfactant to promote spreading thereof when applied to a film substrate.

Furthermore, the coating layer advantageously comprises a drawing agent which preferably comprises an alkylarylphthalate in order to facilitate processing of film into the desired thickness.

The surface of the coating layer is hydrophilic, preferably exhibiting an internal water contact angle, measured as herein described, of less than 70°, more preferably less than 55°, particularly at most than 50°. The surface of the coating layer preferably exhibits an oil-in-water contact angle, measured as described hereinafter, of preferably greater than 140°, more preferably greater than 145°, and especially greater than 150°.

The difference between the water contact angle and the oil-in-water contact angle is preferably greater than 75, more preferably at least 90 and most preferably greater than 95°.

The coating layer composition, preferably in the form of an aqueous dispersion, may be applied to the substrate film surface by conventional coating techniques. The applied medium, generally having a solids content in the range from 1 to 30, preferably 2 to 15, and particularly 5 to 10 weight %, is subsequently dried to remove the dispersant and also to effect cross-linking of the layer. Drying may be effected by conventional techniques, for example by passing the coated film through a hot air oven. Drying may be effected during normal post-formation film-treatments, such as heat-setting.

The thickness of the dried coating layer is preferably greater than 0.1, more preferably greater than 0.4 $\mu$m, and in particular at least 1.0 $\mu$m.

The coating layer composition may be applied to an already oriented film substrate. However, application of the coating medium is preferably effected before or during any stretching operation. In particular, it is preferred according to this invention that the hydrophilic coating composition should be applied to the film between the two stages (longitudinal and transverse) of a biaxial stretching operation. Such a sequence of stretching and coating is especially preferred for the production of linear polyester films, such as polyethylene terephthalate films, which are preferably firstly stretched in the longitudinal direction over a series of rotating rollers, coated with the coating layer composition and then stretched transversely in a stenter oven, preferably followed by heat-setting.

The reverse surface, remote from the coating layer, of a polymeric film according to the invention may be untreated or may have thereon a functional layer, such as a release layer, a backing layer or, an antistatic layer.

The polymeric film of the invention may conveniently contain any of the agents conventionally employed in the manufacture of polymeric films. Thus, agents such as dyes, pigments, lubricants, anti-oxidants, antistatic agents, surface active agents, slip additives, adhesion improvers, scratch resistance enhancers, gloss-improvers, prodegradants, fire-retardants, and ultra-violet light stabilizers may be incorporated in the substrate and/or coating layer, as appropriate.

The polymeric films may vary in thickness depending on the intended application, but films preferably have a total thickness in the range from 5 to 350, more preferably 25 to 250, and particularly 125 to 200 $\mu$m.

In this specification the following test methods have been used to determine certain properties of the filler particles and polymeric film:

Contact Angle

Water contact angles were obtained by photographing the profiles of 5 $\mu$l droplets of distilled water test liquids on the sample surface. The angles were measured by projecting the photographic negative and drawing the tangent to the droplet profile at the point of three phase contact. The contact angles quoted with standard deviations are the mean of the angles measured for 9 drops of each liquid. The standard deviation was 4.

Oil-in-water Contact Angle

The contact angle of a mineral oil (Castrol Solvent Neutral 150) on the test surface submerged in a water environment, was measured by inverting the sample test surface in an glass cell (60×50×55 mm) containing distilled water, and introducing a droplet of the oil (10–40$\mu$l) onto the underside of submerged surface by means of a syringe and curved needle. Images of the drop profile were captured using the FTA-200 Dynamic Contact Angle System and the contact angle automatically calculated using the instrument software. The contact angles quoted are the mean of 9 drops. The standard deviation was 4.

Filler Particle Analysis Volume distributed median particle diameter, and particle size distribution ratios $D_{25}/D_{75}$ and $D_{10}/D_{90}$ were measured using a Coulter LS 130 (Coulter Electronics Ltd. Luton, UK) particle sizer.

BET specific surface area was measured by multi-point nitrogen adsorption using a Micromeritics ASAP 2400 (Micromeritics Limited, Dunstable, UK). Relative pressures between 0.05 and 0.21 were used, and the outgassing conditions were 1 hour at 140° C. with nitrogen purge (1 to 2 liters/hour).

Skeletal density was measured by helium pycnometry using a Micromeritics Accupyc 1330 (Micromeritics Limited, Dunstable, UK).

Adhesion to toner

The adhesion of toner to the hydrophilic coating was estimated by measuring the amount of toner removed from the coating by the following method:

A test image (of toner) was printed onto a sample of the coated film using a Xante laser printer. The test image consisted of eight black rectangular blocks. The optical density of each of the eight blocks was measured using a color transmission-reflection densitometer (model Mackbeth TR927, supplied by Optronic Colour Communications). The highest and lowest measured values were disregarded and the average value of the other six values was recorded as $V_1$. Toner from one block was then removed by applying a piece of adhesive tape (Tesa 4104) and removing the tape in a standard way. Eight further densitometer measurements were then taken of the area from which the toner had been removed and the average value (disregarding the highest and lowest),$V_2$, was compared with the previous average to calculate the % of toner removed by the following equation:

$$\text{toner removed}=(V_1/V_2)\times 100\%.$$

The invention is illustrated by reference to the following examples.

Experimental Method and Materials

The materials used to make up the coating formulations described hereinafter are detailed in Table 1. The composition of each formulation is given in Table 2.

Examples 1 and 2

A clear polyethylene terephthalate polymer was co-extruded with a polyester copolymer made from 18% isophthalate+82% terephthalate+ethylene glycol, cast onto a cooled rotating drum and stretched in the direction of extrusion to approximately 3 times its original dimensions. The copolymer side of the cooled stretched film was then coated by means of offset gravure coating using a rubber applicator roller, with an aqueous coating composition containing the following ingredients in specified quantities.

TABLE 1

| | |
|---|---|
| VPA | Vinyl phosphonic acid supplied by Albright & Wilson. |
| AAVPA 877 | poly (acrylic acid co vinyl phosphonic acid) 70:30 mole % supplied by Albright & Wilson |
| AAVPA 1014 | poly (acrylic acid co vinyl phosphonic acid) 30:70 mole %, Mw approx 60,000, supplied by Albright & Wilson UK) used as 10% w/w aqueous solution |
| AAVPA 10 15 | poly (vinyl phosphonic acid co vinyl sulphonic acid) 10:90 mole % suppliedby Albright & Wilson, UK; used as 10% w/w aqueous solution |
| AAVPA 1021 | poly (acrylic acid co vinyl phosphonic acid co vinyl sulphonic acid) 40:50:10 mole %, Mw approx 60,000, supplied by Albright & Wilson, UK; used as 25% w/w aqueous solution |
| aptsa | ammonium paratoluenesulphonic acid (x-link catalyst) used as 10% w/w aqueous solution |
| Cymel 350 | Methylated melamine formaldehyde cross-linking agent, obtained from Dyno-Cyanamid K.S., used as 10% w/w aqueous solution |
| DMU | Dimethylol urea obtained from Aldrich, used as 10% w/w aqeuous solution |
| Neocryl BT-70 | acrylic-styrene copolymer emulsion, supplied by Zeneca; used as 19% w/w aqueous solution |
| Seahostar KE-70 | a mono ethylene glycol/silica mixture, obtained from Nippon Shokubai Co. Ltd; used as 20% w/w aqueous solution |
| Synperonic NP 10 | an alkyl nonylphenol ethoxylated surfactant supplied by Imperial Chemical Industries; used as 10% w/w aqueous solution |
| Santisizer 261 mico-emulsion | Iso-Octyl benzyl phathlate supplied by Monsanto; used as a 2% w/w aqueous solution |
| Tospearl 120 | 2 $\mu$m particles of a cross-linked polysiloxane filler, obtained from Toshiba Silicone Co Ltd; used as 2% w/w dispersion in ethylene glycol |

TABLE 1-continued

| | |
|---|---|
| Tospearl 344 | 4.5μ particles of a polysiloxane filler, supplied by Toshiba Silicone Co Ltd. |
| Glycerol | |
| Milease T | Polyester resin supplied by ICI Americas |

The polyester film was coated on one side only. The coated film was passed into a stenter oven, where the film was dried and stretched in the sideways direction to approximately 3 times its original dimensions. The biaxially stretched coated film was heat set at a temperature of about 200° C. by conventional means. Final coating thickness was 0.03–0.05 μm with a coat weight of approximately 0.3 to 0.5 mgdm$^{-2}$. The surface characteristics of the coated films and adhesion of toner were tested as described above and the results are given in Table 3.

Example 3

A coating formulation as shown in Table 2 was prepared and the film coated by the same method as described in Examples 1 and 2. The coating was applied at three different coat weights to give dried coating thicknesses of 2.8, 1.2 and 0.7 μm. The water contact angles were measured and are given in Table 3. The results show that a thicker film has a lower water contact angle and is therefore more hydrophilic.

The Santisizer 261 is a drawing agent and is made into, and used as, a 2% micro-emulsion. To prepare the micro-emulsion used in Examples 7 and 8:

Add 200 ml of neat Santisizer 261 and 800 ml neat Synperonic NP10 to a clean plastic bottle. Screw on the lid and shake well to produce a clear, one phase, liquid. Pour slowly into a vessel containing 9 liters of deionized water with stirring. Allow to stir for 10 minutes, then stand to allow foam to disperse.

Examples 4–9

Coating formulations as shown in Table 2 were prepared and the film coated by the same method as described in Examples 1 and 2.

The results for the water contact angles given in Table 3 show that addition of a drawing agent such as glycerol, in particular Santisizer 261 substantially decreases the water contact angle.

TABLE 3

| | Water Contact Angle° | Oil in Water Contact Angle° | (Oil in Water Contact Angle) - (Water Contact Angle) | Toner Removed % |
|---|---|---|---|---|
| Example 1 | 50 | 145 | 95 | 24 |
| Example 2 | 39 | 150 | 111 | 44 |
| Example 3 (2.8μ) | 23 | 142 | 125 | |
| (1.2μ) | 28 | | | |
| (0.7μ) | 54 | | | |
| Example 4 | 44 | | | |
| Example 5 | 14 | | | |
| Example 6 | 26 | | | |
| Example 7 | 12 | | | |
| Example 8 | <1 | | | |
| Example 9 | 7.4 | | | |

What is claimed is:

1. A printing plate comprising a polymeric film substrate having on at least one surface thereof, a coating layer comprising a polymer comprising at least one or more repeating units comprising at least one pendant (-POXY) group, wherein X and Y, which may be the same or different, are OH or OM wherein M is a cation, wherein said coating layer polymer further comprises 10 to 70 mole % of repeating units containing pendant carboxyl groups or groups which are capable of forming carboxyl groups on hydrolysis, and wherein said coating layer polymer further comprises a comonomer which is a sulphonated monomer or a salt or other derivative thereof wherein said coating layer polymer comprises a copolymer of acrylic acid, vinyl phosphonic acid and sodium vinyl sulphonate.

2. A printing plate comprising a polymeric film substrate having on at least one surface thereof, a coating layer comprising a polymer comprising at least one or more repeating units comprising at least one pendant (-POXY) group, wherein X and Y, which may be the same or different, are OH or OM wherein M is a cation, wherein said coating layer polymer further comprises 10 to 70 mole % of repeating units containing pendant carboxyl groups or groups which are capable of forming carboxyl groups on hydrolysis, and wherein said coating layer polymer further comprises a comonomer which is a sulphonated monomer or a salt or other derivative thereof wherein said coating layer polymer comprises a drawing agent.

TABLE 2

| | Example 1 % w/w | Example 2 % w/w | Example 3 % w/w | Example 4 % w/w | Example 5 % w/w | Example 6 % w/w | Example 7 % w/w | Example 8 % w/w | Example 9 % w/w |
|---|---|---|---|---|---|---|---|---|---|
| VPA | | | | | | | | | 1.2 |
| AAVPA 877 | | | | 2 | | | | | |
| AAVPA 1014 | | 8 | | | 2 | | | | |
| AAVPA 1021 | 8 | | 2 | | | | 2 | 2 | |
| AAVPA 1015 | | | | | | 2 | | | |
| aptsa | 0.03 | 0.03 | 0.2 | 0.2 | 0.2 | 0.2 | 0.2 | 0.2 | |
| Cymel 350 | 0.43 | 0.43 | | | | | | | 8.3 |
| DMU | | | 2 | 2 | 2 | 2 | 2 | 2 | |
| Neocryl BT-70 | 1 | 1 | | | | | | | |
| Seahostar KE-70 | 0.02 | 0.02 | | | | | | | |
| Synperonic NP10 | | | 0.2 | 0.2 | 0.2 | 0.2 | 0.2 | 0.2 | 0.2 |
| Santisizer 261 micro-emulsion | | | | | | | 0.1 | 1 | |
| Tospearl 120 | 0.01 | 0.01 | | | | | | | |
| Tospeal 344 | | | | | | | | | 24 |
| Glycerol | | | 4 | 4 | 4 | 4 | | | |
| Milease T | | | | | | | | | 4.7 |
| demineralised water | 90.5 | 90.5 | 91.6 | 91.6 | 91.6 | 91.6 | 95.77 | 94.8 | 61.6 |

3. A printing plate according to claim 2 wherein said coating layer polymer comprises repeat units containing pendant phosphonic acid groups and/or salts.

4. A printing plate according to claim 2 wherein said coating layer polymer comprises a copolymer comprising one or more acrylic comonomers.

5. A printing plate according to claim 2 wherein said coating layer polymer comprises a copolymer of acrylic acid and vinyl phosphonic acid.

6. A printing plate according to claim 2 wherein the drawing agent comprises an alkylarylphthalate.

7. A printing plate according to claim 2 wherein said coating layer polymer further comprises a filler.

8. A printing plate according to claim 2 wherein said coating layer polymer further comprises a cross-linking agent.

9. A printing plate comprising a polymeric film which is substantially gelatin free and comprises a polymeric film substrate having on at least one surface thereof, a coating layer comprising a polymer comprising at least one or more repeating units comprising at least one or more pendant (-POXY) groups, wherein X and Y, which may be the same or different, are OH or OM wherein M is a cation and wherein said coating layer polymer comprises a copolymer of acrylic acid, vinyl phosphonic acid and sodium vinyl sulphonate.

10. A printing plate according to claim 1, 2 or 9 wherein the amount of POXY groups in the polymer is in a range from 10 to 90 mole %.

11. A printing plate according to claim 10 wherein said range is 30 to 80 mol %.

* * * * *